United States Patent
Senatori (10) Patent No.: US 9,798,357 B2
(45) Date of Patent: *Oct. 24, 2017

(54) RETRACTABLE DOCKING SYSTEM

(71) Applicant: Dell Products L.P., Round Rock, TX (US)

(72) Inventor: Mark David Senatori, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/991,643

(22) Filed: Jan. 8, 2016

(65) Prior Publication Data

US 2016/0124465 A1    May 5, 2016

Related U.S. Application Data

(63) Continuation of application No. 13/630,437, filed on Sep. 28, 2012, now Pat. No. 9,235,237.

(51) Int. Cl.
*G06F 1/16* (2006.01)
*G06F 1/20* (2006.01)

(52) U.S. Cl.
CPC ............ *G06F 1/1632* (2013.01); *G06F 1/203* (2013.01); *Y10T 29/49117* (2015.01)

(58) Field of Classification Search
CPC ........ G06F 1/1632; G06F 21/31; G06F 21/86; G06F 2203/04809; G06F 3/0346; G06F 1/203
USPC ............ 361/679.26, 679.43, 679.31, 679.27, 361/679.41, 679.01, 679.02, 679.09, 361/679.21, 679.55–679.58; 710/303–305; 29/825

See application file for complete search history.

(56) References Cited

U.S. PATENT DOCUMENTS

| | | | |
|---|---|---|---|
| 5,737,541 A | 4/1998 | Shimizu et al. | |
| 6,264,488 B1 | 7/2001 | Helot et al. | |
| 6,297,953 B1* | 10/2001 | Helot | G06F 1/1632 361/679.41 |
| 7,508,658 B2* | 3/2009 | Ling | G06F 1/1632 361/679.55 |
| 2014/0092546 A1 | 4/2014 | Senatori | |

* cited by examiner

*Primary Examiner* — Anthony Haughton
*Assistant Examiner* — Ingrid Wright
(74) *Attorney, Agent, or Firm* — Haynes and Boone, LLP (57) ABSTRACT

An information handling system (IHS) docking system includes an IHS chassis defining an alignment member passageway and an IHS connector opening. An IHS connector is movably coupled to the IHS chassis adjacent the IHS connector opening and resiliently biased into a retracted orientation. An alignment member securing device is moveably coupled to the IHS chassis adjacent the alignment member passageway and resiliently biased into a non-securing orientation. At least one docking actuator is located in the alignment passageway and coupled to the IHS connector and alignment member securing device. When the IHS chassis is docked with a docking station including a docking connector and an alignment member, the alignment member engages the at least one docking actuator to move the IHS connector relative to the IHS chassis to mate with the docking connector, and move the alignment member securing device relative to the IHS chassis to engage the alignment member.

14 Claims, 13 Drawing Sheets

RETRACTABLE DOCKING SYSTEM

CROSS-REFERENCE TO RELATED APPLICATIONS

This is a Continuation application to U.S. Utility application Ser. No. 13/630,437, filed Sep. 28, 2012, entitled "RETRACTABLE DOCKING SYSTEM," the disclosure of which is incorporated herein by reference in their entirety.

BACKGROUND

The present disclosure relates generally to information handling systems, and more particularly to retractable docking system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some conventional portable IHSs such as, for example, laptop and/or notebook IHSs, are operable to connect to a docking station in order to quickly and easily couple the portable IHS to a plurality of external peripheral devices including a pointing device, a keyboard, a monitor, a network connection, an external hard drive, and/or a variety of other peripheral devices known in the art that may be connected to the docking station. The docking station includes a docking connector that provides a single connection between the portable IHS and the peripheral devices coupled to the docking station that allows the functionality of the portable IHS to be expanded. The docking connectors on a majority of conventional docking stations have become standard among many users with large existing user bases utilizing docking stations having the same type or types of docking connectors. Those type docking connectors were conceived of many years ago when portable IHS were much thicker, and as portable IHSs become thinner, it is becoming more and more difficult to accommodate the required mating features and dimensions for the docking systems in the portable IHS.

For example, docking stations typically include a base having two fixed alignment posts with the docking connector located between the alignment posts. The distance between the tops of the alignments posts and the mating portion of the docking connector is fixed and was designed for relatively thick portable IHSs that can allow the alignment posts to extend into the portable IHS such that the docking connector mates with the IHS connector on the portable IHS. However, as portable IHSs become thinner, the alignment posts must extend too far into the portable IHS in order to allow the docking connector to mate with the IHS connector and would require the alignment posts to occupy a volume in the portable IHS that is used for other portable IHS components (e.g., the keyboard). As such, docking systems are not currently provided for thin or ultra-thin portable IHSs.

Accordingly, it would be desirable to provide an improved docking system.

SUMMARY

According to one embodiment, an information handling system (IHS) includes an IHS chassis defining an alignment member passageway and an IHS connector opening; a processor housed in the IHS chassis; a memory coupled to the processor and housed in the IHS chassis; an IHS connector electrically coupled to the processor, movably coupled to the IHC chassis adjacent the IHS connector opening, and resiliently biased into a retracted orientation; an alignment member securing device moveably coupled to the IHS chassis adjacent the alignment member passageway and resiliently biased into a non-securing orientation; and at least one docking actuator located in the alignment passageway and coupled to the IHS connector and the alignment member securing device; wherein in response to a docking of the IHS chassis with a docking station that includes a docking connector and an alignment member located adjacent the docking connector, the alignment member engages the at least one docking actuator to move the IHS connector relative to the IHS chassis and to an extended orientation to mate with the docking connector, and move the alignment member securing device relative to the IHS chassis and to a securing orientation to engage the alignment member.

DRAWINGS

FIG. 3b is a cross sectional view illustrating an embodiment of IHS docking components in the IHS of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (1/0) devices, such as a keyboard, a mouse, and a video display. The IHS may also include one or more buses operable to transmit communications between the various hardware components.

Figure 1:
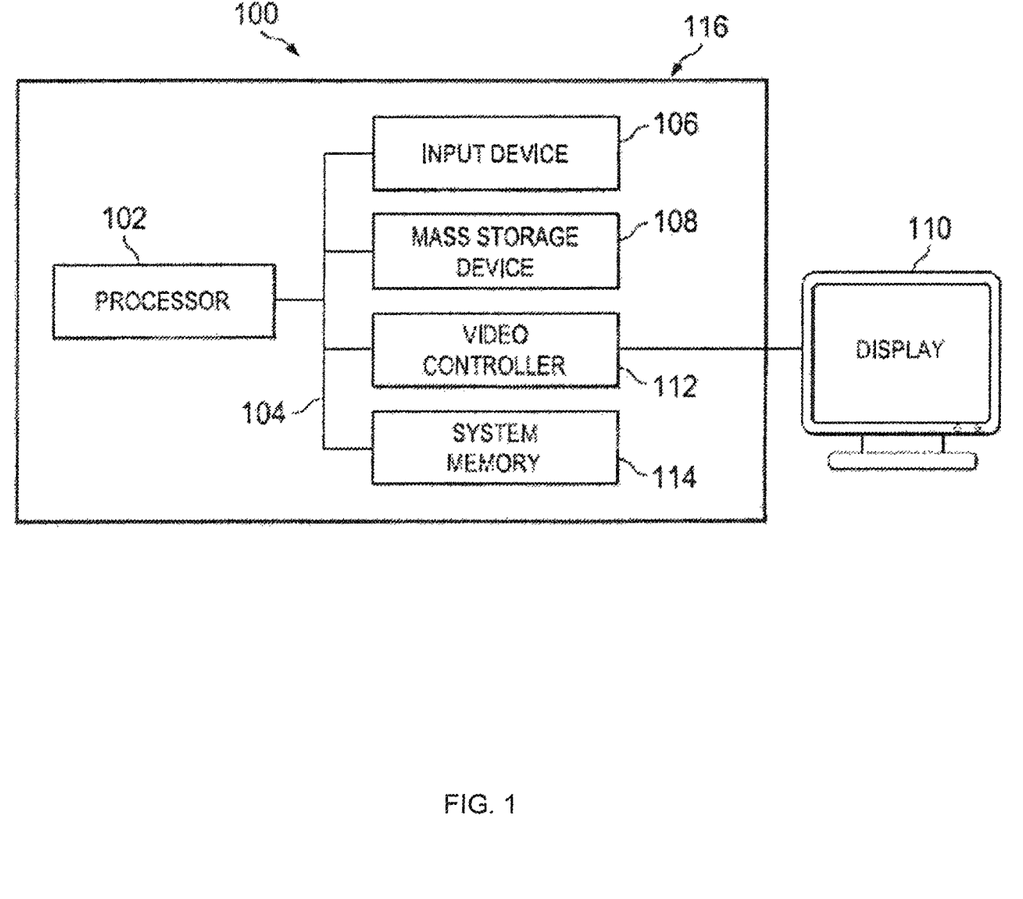
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
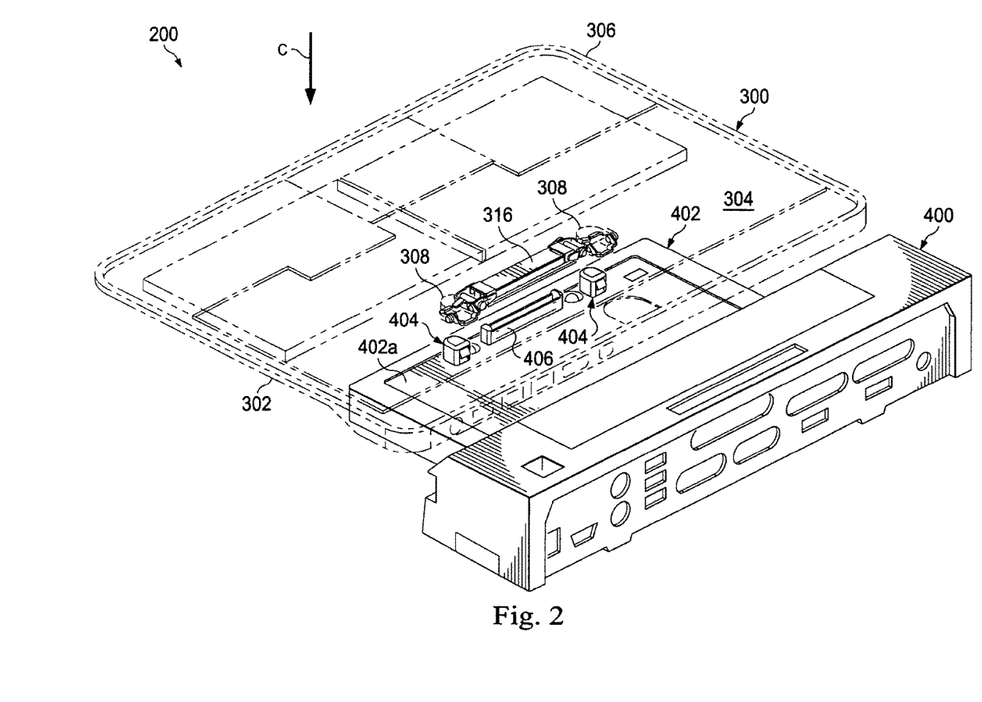
FIG. 2 is a perspective view illustrating an embodiment of an IHS chassis and a docking station.
Figure 3A:
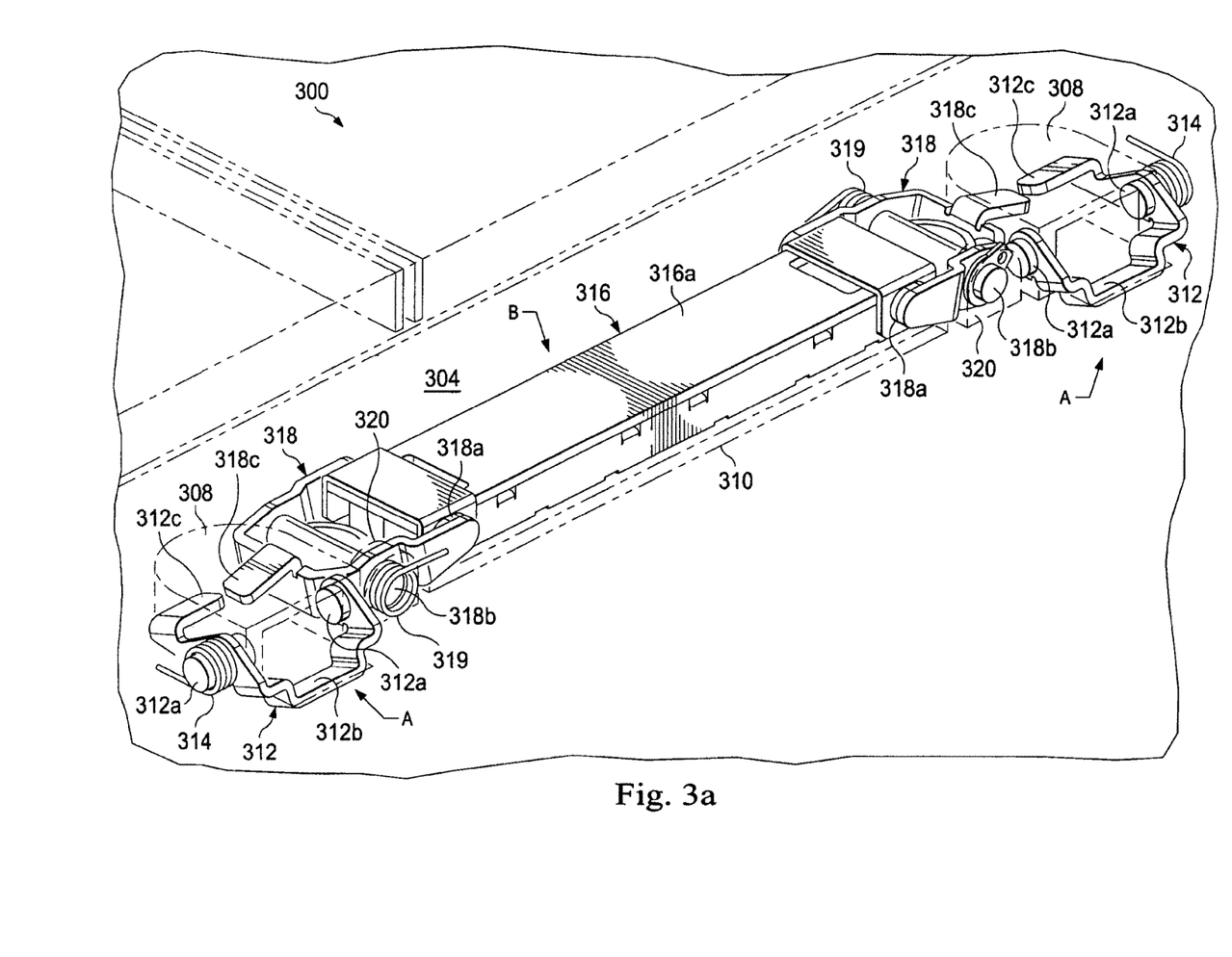
FIG. 3a is a perspective view illustrating an embodiment of IHS docking components in the IHS of FIG. 2.
Figure 3B:
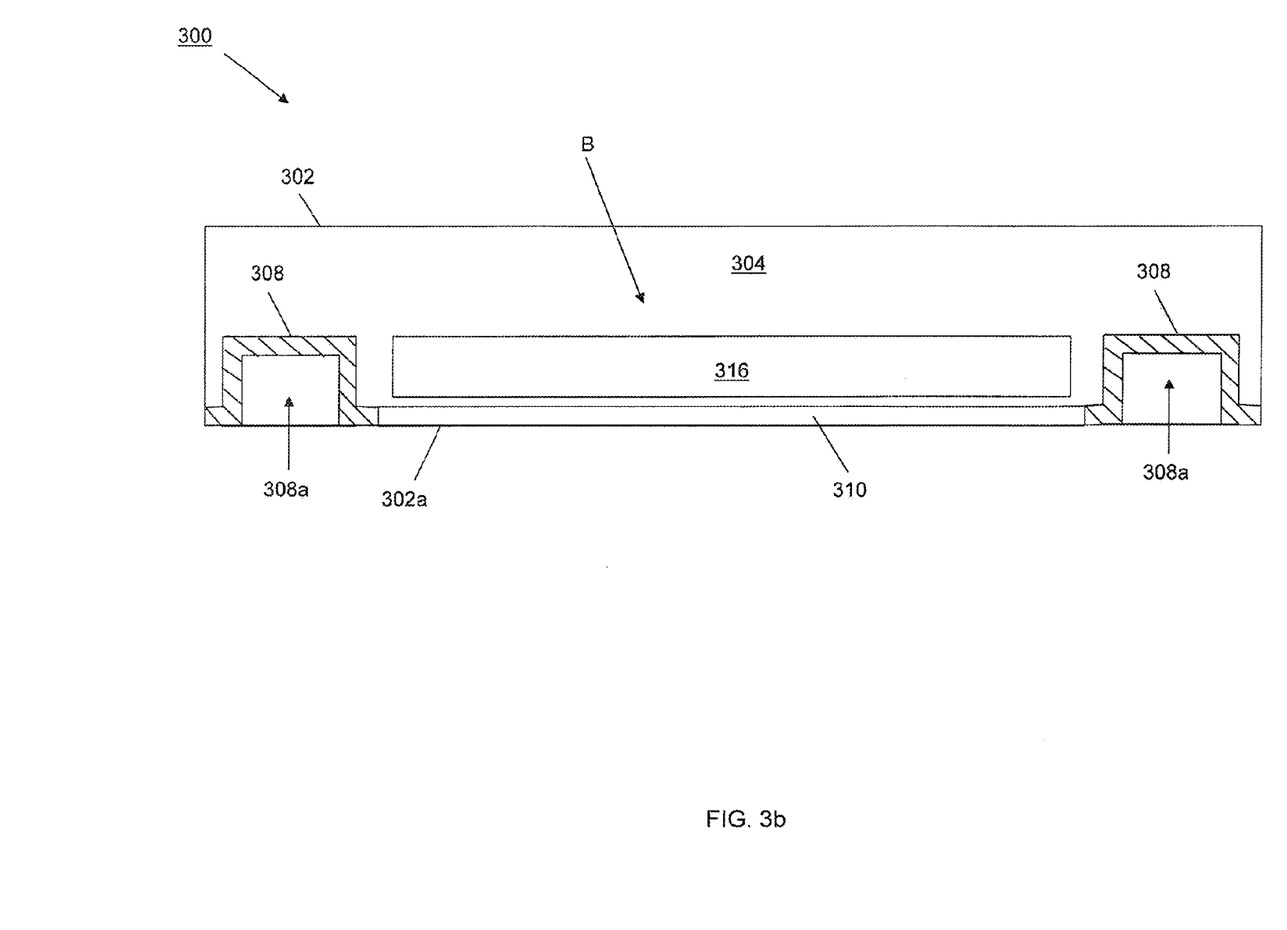
Figure 4:
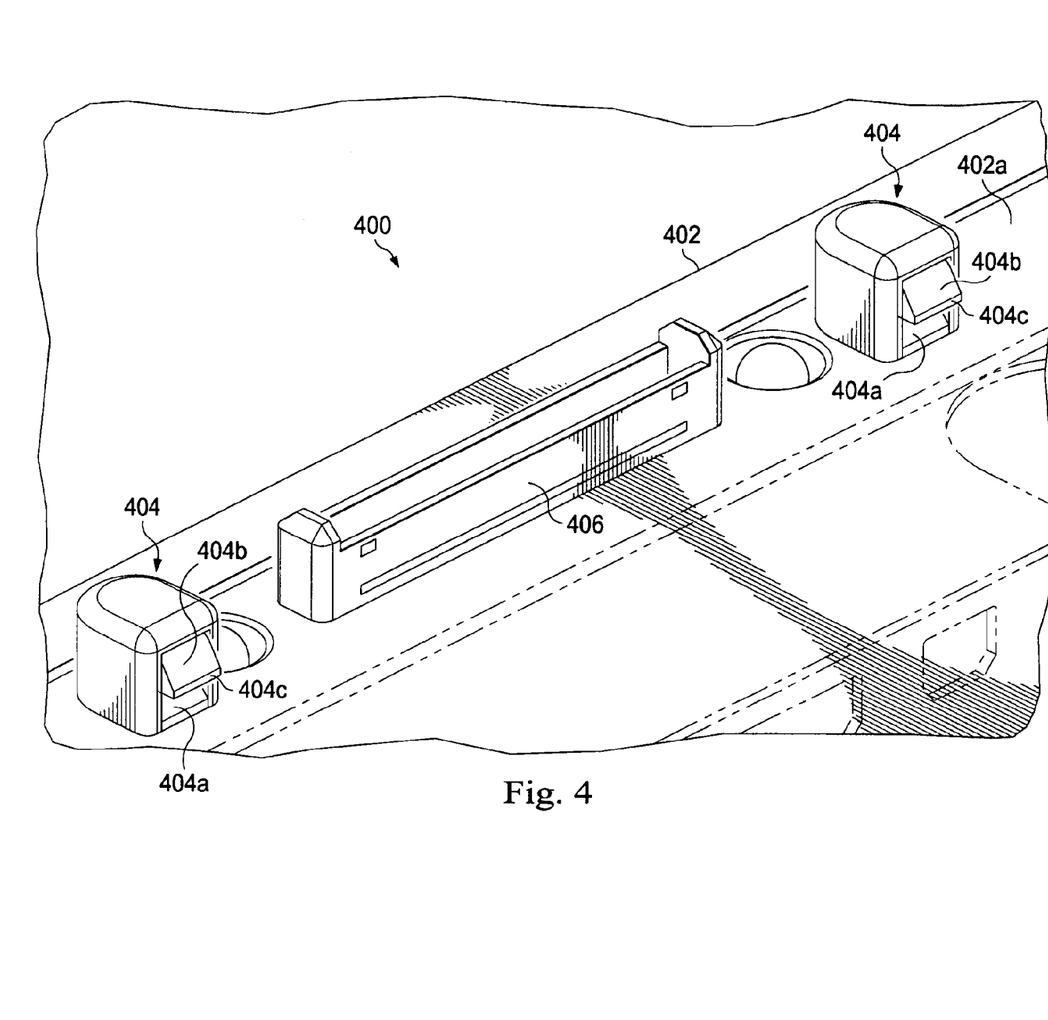
FIG. 4 is a perspective view illustrating an embodiment of docking station docking components in the docking station of FIG. 2.

Referring now to FIGS. 2, 3, and 4, an embodiment of a docking system 200 is illustrated. In the illustrated embodiment of the docking system 200 discussed below, an IHS chassis 300, which may be the chassis 116 discussed above with reference to FIG. 1 and which may house any or all of the IHS components (e.g., the processor 102, the memory 114, etc.) of the IHS 100 discussed above with reference to FIG. 1, is operable to be coupled to a docking station 400. However, the present disclosure may be applied to a variety of dockable components known in the art that are operable to be coupled to docking stations.

Referring to FIGS. 2, 3a, and 3b, the IHS chassis 300 includes a chassis base 302 that defines a housing 304 that, in the illustrated embodiment, include a chassis base defining a housing in a portable IHS that houses a processor, memory, and other IHS components. The chassis base 302 is moveably coupled to a display section 306 by, for example, a pivotal coupling that allows the display section 306 to rotate relative to the chassis base 302, as is known in the art. In the embodiment illustrated in FIG. 2, the display section 306 has been moved relative to the chassis base 302 such that the display section 306 is located immediately adjacent the chassis base 302 and the IHS chassis 300 may be docked with the docking station 400. However, one of skill in the art will recognize that the display section 306 may be moved relative to the chassis base 302 such that the display section 306 is oriented at an angle (e.g., over 90 degrees) to the chassis base 302 when docking or docked to the docking station 400.

The chassis base 302 includes an outer surface 302a that provides a bottom surface of the IHS chassis 300. The chassis base 302 includes plurality of alignment passageway portions 308 that extend into the housing 304 of the chassis base 302 and that each define an alignment member passageway 308a that extends into the housing of the IHS chassis 300 from the outer surface 302a of the chassis base 302, as illustrated in FIG. 3b. In an embodiment, the IHS chassis 300 is a chassis for a "thin" or "ultrathin" IHS, and the distance between the upper and lower surfaces of the IHS chassis (i.e., the largest outer surfaces of the display section 306 and the chassis base 302 that are substantially parallel to each other and face away from each other) has been minimized by closely spacing IHS components in the housing 304 of the chassis base 302. In such embodiments, the alignment passageway portions 308 of the chassis base 302 do not extend as far into the housing 304 relative to conventional IHS chassis, as IHS components in the housing 304 (e.g., the keyboard components in the housing 304 of the chassis base 302) occupy the needed volume in the thin or ultrathin IHS. Thus, the alignment member passageways 308a also do not extend as far into the housing 304 of the chassis base 302 relative to conventional alignment member passageways. The chassis base 302 also defines an IHS connector opening 310 that extends through the chassis base 302 from the outer surface 302a of the chassis base 302 to the housing 304.

An alignment member securing device 312 is moveably coupled to the IHS chassis 300 and located adjacent each of the alignment member passageways 308a. In the illustrated embodiment, each alignment member securing device 312 is pivotally coupled to a respective alignment passageway portion 308 on the chassis base 302 by pivotal connections 312a. A first portion of each alignment member securing device 312 extends between its pivotal connections 312a and includes a securing member 312b, while a docking actuator 312c on the alignment member securing device 312 extends from one of the pivotal connections 312a and into the alignment member passageway 308a. Each alignment member securing device 312 is resiliently biased into a non-securing orientation A, illustrated in FIG. 3a. In the illustrated embodiment, each alignment member securing device 312 is resiliently biased into the non-securing orientation A by a resilient member 314 that is coupled to a pivotal coupling 312 and engages the chassis base 302 to bias the securing member 312b into the housing 304 of the chassis base 302 and out of the alignment member passageway 308a.

An IHS connector 316 is moveably coupled to the IHS chassis 300 and located adjacent the IHS connector opening 310. As discussed above, while the illustrated embodiment is directed to an IHS, other component connectors may be moveably coupled to a dockable component chassis and located adjacent a component connector opening similarly to the IHS connector in IHS chassis 300 discussed herein. In the illustrated embodiment, the IHS connector 316 is moveably coupled to the IHS chassis 300 through a plurality of IHS connector moveable couplers 318. The IHS connector moveable couplers 318 are pivotally coupled to opposite distal ends of the IHS connector 316 through a plurality of pivotal connections 318a to the IHS connector 316. The IHS connector moveable couplers 318 are also pivotally coupled through a plurality of pivotal connections 318b to a plurality of chassis base coupling members 320 on the chassis base 302 that extend into the housing 304. As can be seen in the illustrated embodiment, the pivotal connections 318b for the IHS connector moveable couplers 318 allow pivotal movement about a first pivotal axis that is substantially perpendicular to a second pivotal axis about which pivotal movement is allowed by the pivotal connections 312a for the alignment member securing device 312. The pivotal connections 318a and 318b and the IHS connector moveable couplers 318 allow for restricted lateral movement that may be accounted for in the IHS connector/docking connector mating tolerance.

Each IHS connector moveable coupler 318 includes a docking actuator 318c that extends from the IHS connector moveable coupler 318 between the pivotal connections 318b and into the alignment member passageway 308a. Each IHS connector moveable coupler 318 is resiliently biased to position the IHS connector 316 into a retracted orientation B, illustrated in FIGS. 3a and 3b. In the illustrated embodiment, each IHS connector moveable coupler 318 resiliently biases the IHS connector 316 into the retracted orientation B by a resilient member 319 that is coupled to a pivotal coupling 316b and engaging the chassis base 302 to bias the IHS connector moveable coupler 318 such that the IHS connector 316 is housed in the housing 304 of the chassis base 302 and does not extend out of the IHS connector opening 310.

While, in the illustrated embodiment, the IHS connector 316 in the retracted orientation B is fully housed in the housing 304 of the chassis base 302, different retracted orientations for the IHS connector 316 will fall within the scope of the present disclosure. For example, in the retracted orientation B, the IHS connector 316 may be located partially in the housing 304 of the chassis base 302 and partially in the IHS connector opening 310 such that IHS connector 316 is flush with the outer surface 302a of the chassis base 302. In another example, in the retracted orientation B, the IHS connector 316 may be located partially in the housing 304 of the chassis base 302, partially in the IHS connector opening 310, and partially extending from the IHS connector opening 310 such that IHS connector 316 includes a portion extending from the outer surface 302a of the chassis base 302.

The IHS connector 316 may include a flexible printed circuit board 316a that is cabled or otherwise connected to a main printed circuit board (not illustrated) that is located in the housing 304 of the chassis base 302 and that may couple the IHS connector 316 to a processor, memory, and/or other IHS components. The connection of the flexible printed circuit board 316a to the main printed circuit board allows for movement of the IHS connector 316 relative to the IHS chassis 300, discussed in further detail below. It is noted that FIG. 3b is provided along with FIG. 5h below with the alignment member securing devices 312 and the IHS connector moveable couplers 318 omitted for clarity in order to illustrate an embodiment of the movement of the IHS connector 316.

While, in the illustrated embodiment, the alignment member securing devices 312 and the IHS moveable couplers 318 are provided as two sets of armatures that may be actuated by an alignment member to cause movement of the IHS connector 316 and the securing member 312b (through the docking actuators 312c and 318c), discussed in further detail below, the present disclosure is not intended to be limited to this illustrated embodiment. One of skill in the art will recognize that a single armature that combines the functions of the alignment member securing devices 312 and the IHS moveable couplers 318 will fall within the scope of the present disclosure. For example, a single docking actuator (similar to the docking actuators 312c and 318c) may extend into each alignment member passageway 308a and be coupled to each of the alignment member securing device 312 and the IHS moveable coupler 318 such that an alignment members engagement with that single docking actuator will cause movement of the IHS connector 316 and the securing member 312b. Thus, a wide variety of modification to the specific components provided in the illustrated embodiment and discussed herein to provide the functionality discussed below is envisioned as falling within the present disclosure.

Referring now to FIGS. 2 and 4, the docking station 400 includes a docking station base 402 having a docking station surface 402a. A plurality of alignment members 404 extend from the docking station surface 402a on the docking station base 402 in a spaced apart relationship from each other. Each alignment member 404 includes an IHS securing member 404a. In some embodiments, the IHS securing member 404a may be resiliently coupled to the alignment member 404 such that the IHS securing member may move relative to the alignment member 404 and, for example, into a cavity defined by the alignment member 404. Each IHS securing member 404a includes a securing member actuator 404b having a stop surface 404c. A docking connector 406 extends from the docking station surface 402a on the docking station base 402 and between the alignment members 404. The docking connector 406 is coupled to a plurality of peripheral device connectors located on the docking station 400 in order provide a single connector for connecting the IHS to one or more peripheral devices connected to one or more of the plurality of peripheral device connectors, as is known in the art.

In an embodiment, the docking station 400 is a conventional docking station having standard dimensioned alignment members 402a and a standard dimensioned docking connector 406 (i.e., the docking station 400 is a legacy docking station known in the art currently used by a plurality of IHS users.) In other embodiments, the docking station 400 may be a non-conventional docking station. As is known in the art, the docking connector 406 may be dimensioned to create a "wiping length" when mating with an IHS connector in order to provide a length of the docking connector 406 that engages the IHS connector to remove build up or other foreign matter on the IHS connector and/or docking connector that can interrupt electrical contact. For example, the "wiping length" of the docking connector 406 may be 1.8 millimeters.

Figure 5A:
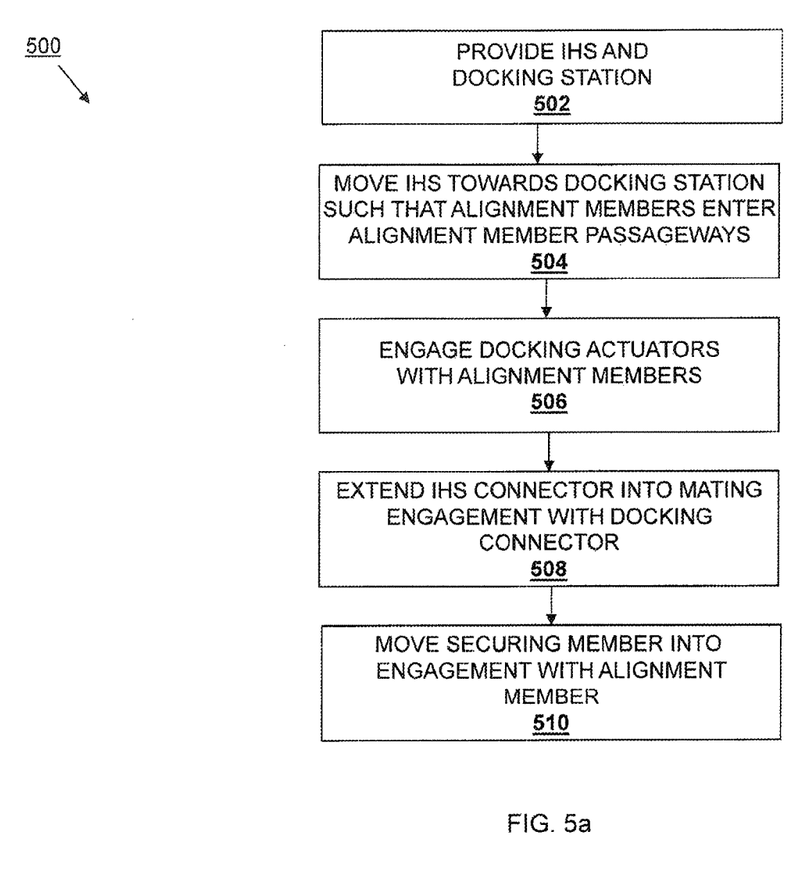
FIG. 5a is a flow chart illustrating an embodiment of a method for docking an IHS.
Figure 5B:
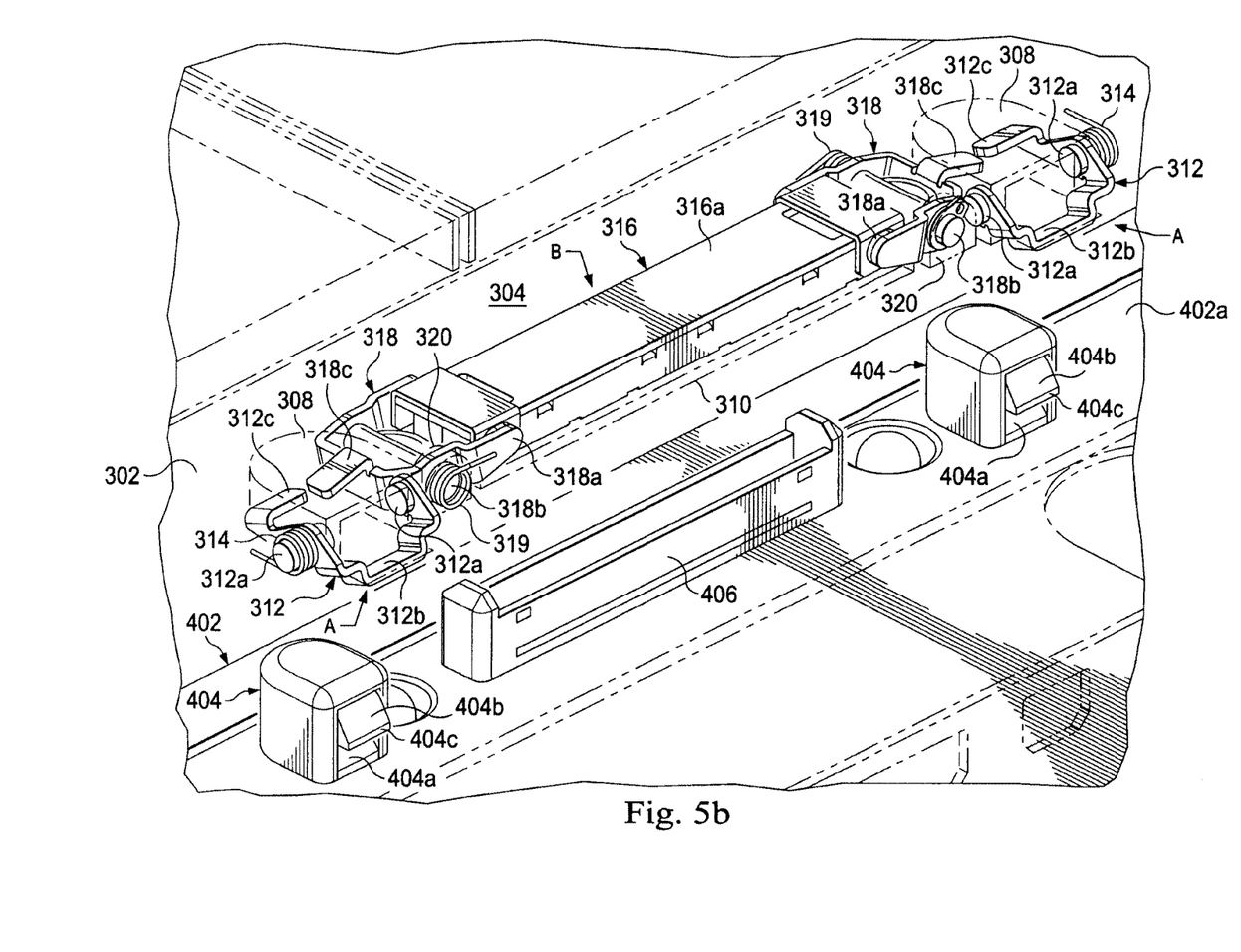
FIG. 5b is a perspective view illustrating an embodiment of an IHS prior to docking with a docking station.
Figure 5C:
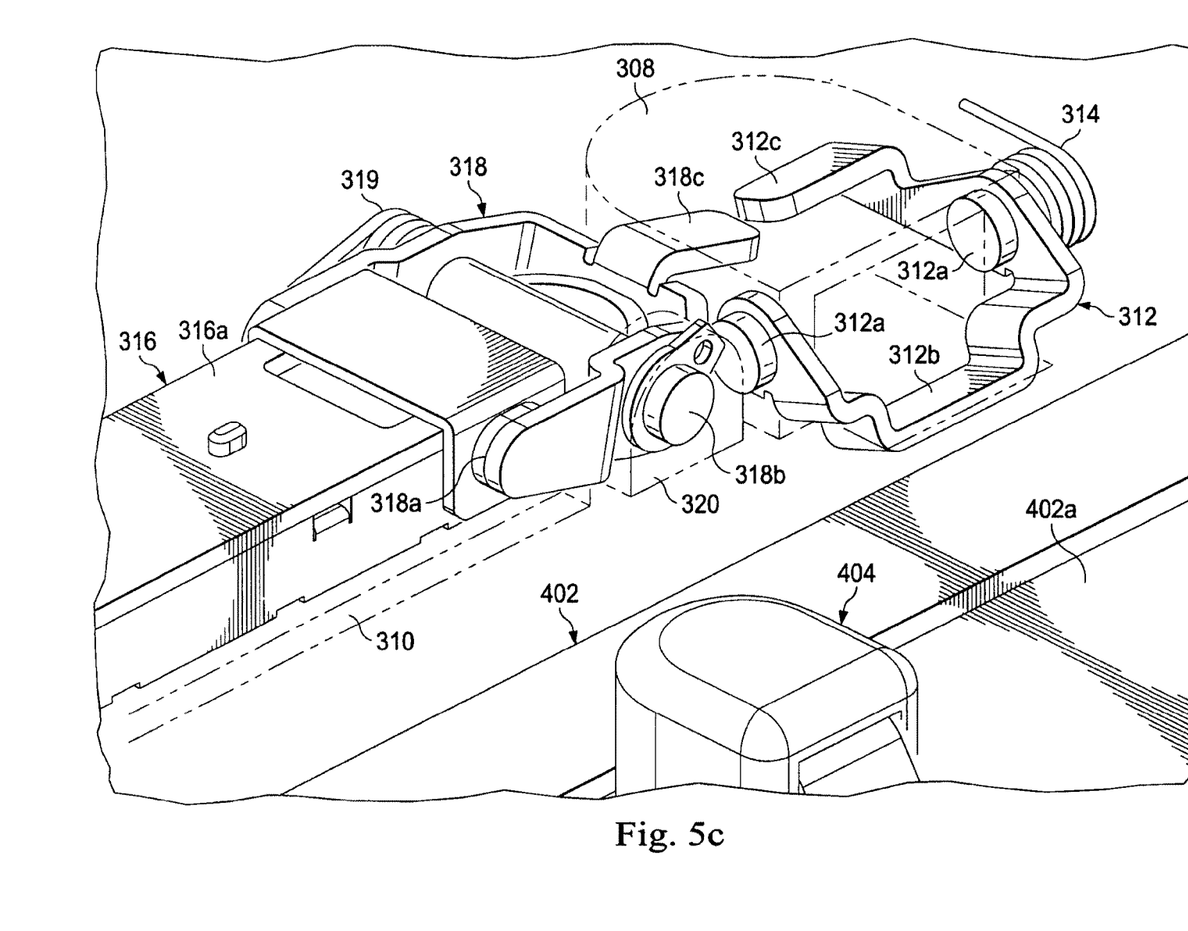
FIG. 5c is a perspective view illustrating an embodiment of the IHS docking components prior to docking with a docking station.

Referring now to FIGS. 2, 3a, 3b, 5a, 5b, and 5c, a method 500 for docking an information handling system is illustrated. The method 500 begins at block 502 where an IHS and a docking station are provided. In an embodiment, the IHS including the IHS chassis 300 and the docking station 400, illustrated in FIG. 2, are provided. As discussed above, when not docked to the docking station 400, the alignment member securing devices 312 are biased into an unsecured orientation A with their respective securing members 312b located in the housing 304 and out of the alignment member passageways 308a, and the IHS connector moveable couplers 318 resiliently bias the IHS connector 316 into a retracted orientation B such that the IHS connector is located in the housing 304 of the chassis base 302. To begin the docking process, the IHS chassis 300 is positioned adjacent the docking station 400 such that the alignment member passageways 308a on the IHS chassis 302 are aligned with the alignment members 404 on the docking station 400 and the IHS connector opening 310 on the IHS chassis 302 is aligned with the docking connector 406 on the docking station 400, as illustrated in FIGS. 2, 5b, and 5c.

Figure 5D:
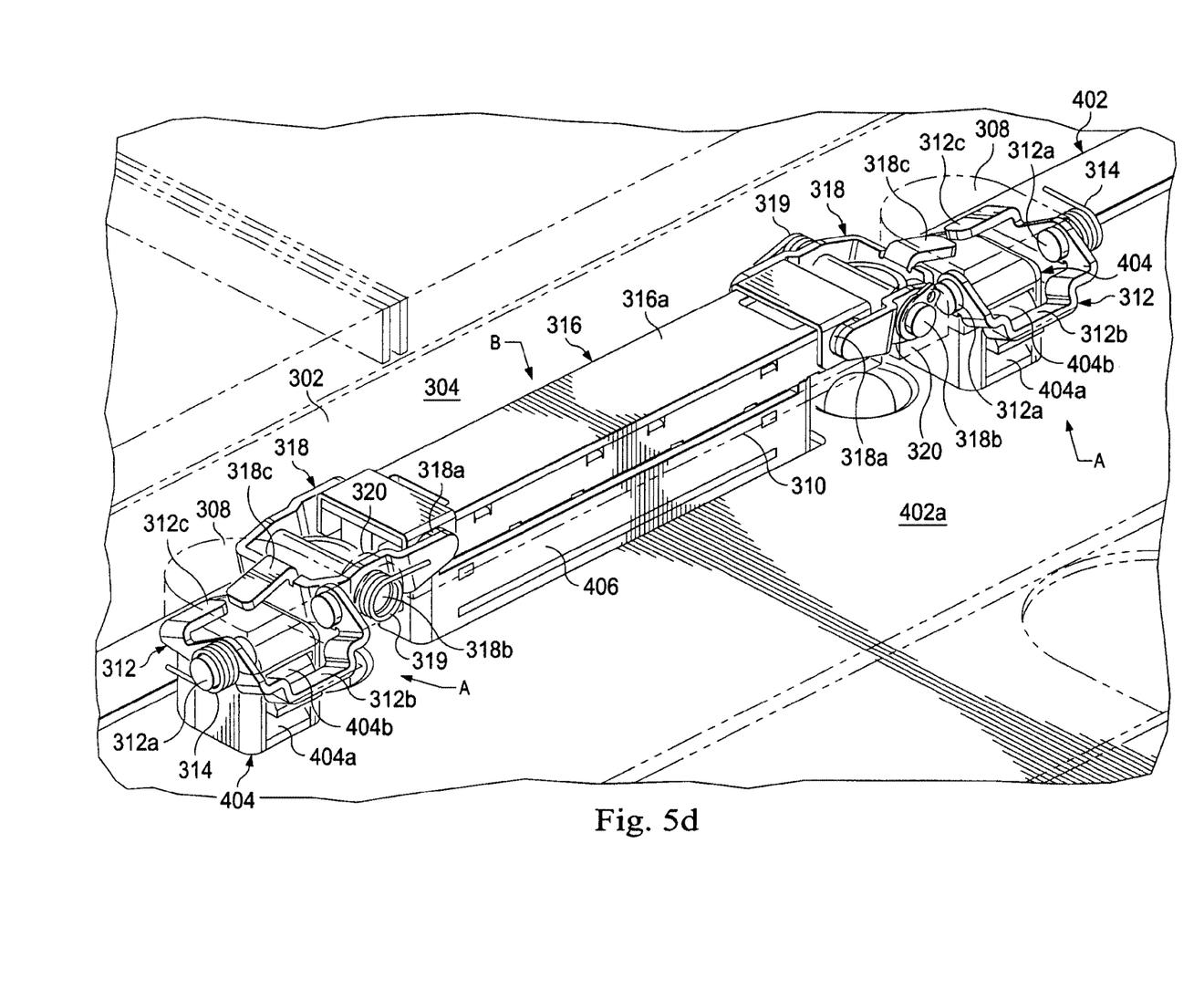
FIG. 5d is a perspective view illustrating an embodiment of an IHS being docked with a docking station.
Figure 5E:
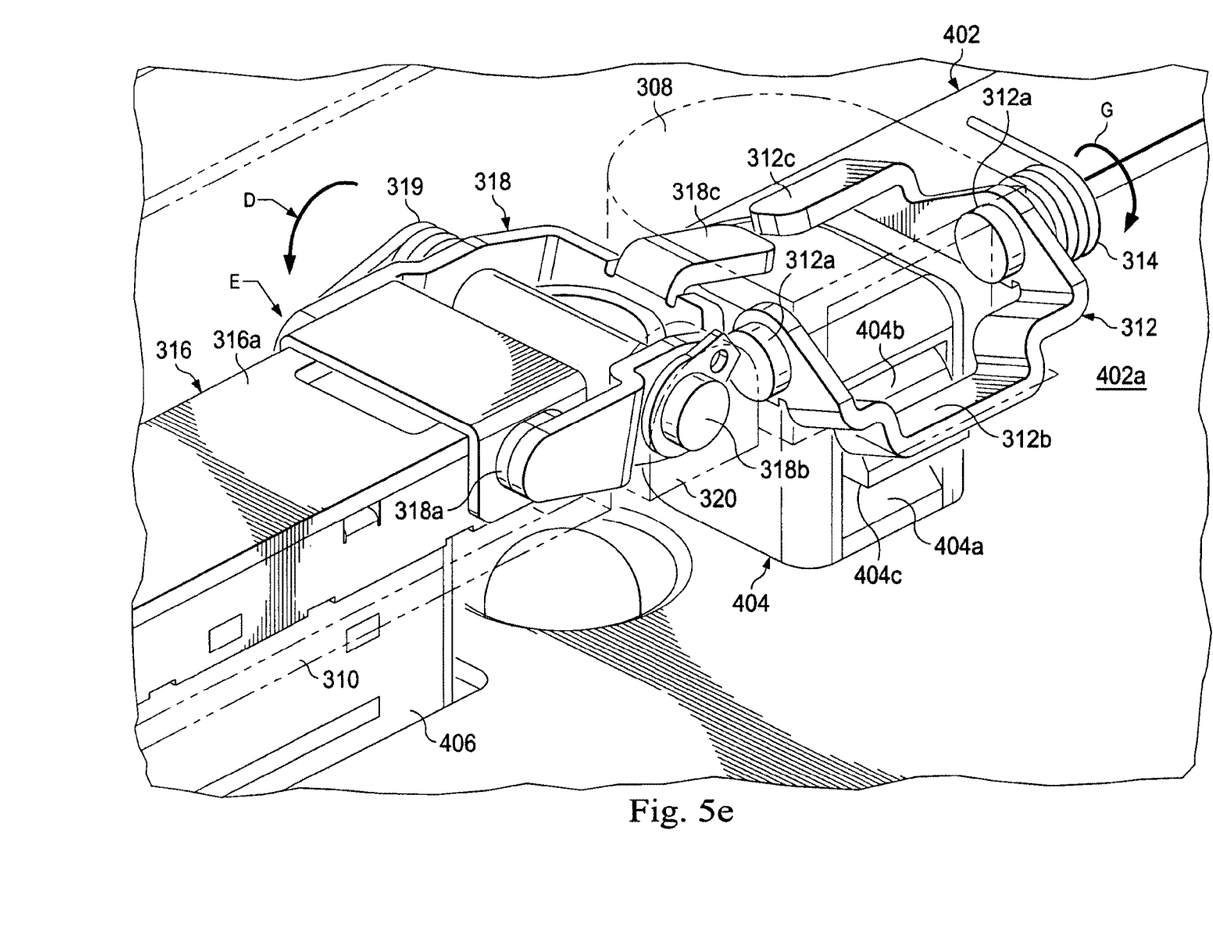
FIG. 5e is a perspective view illustrating an embodiment of the IHS docking components being docked with a docking station.
Figure 5F:
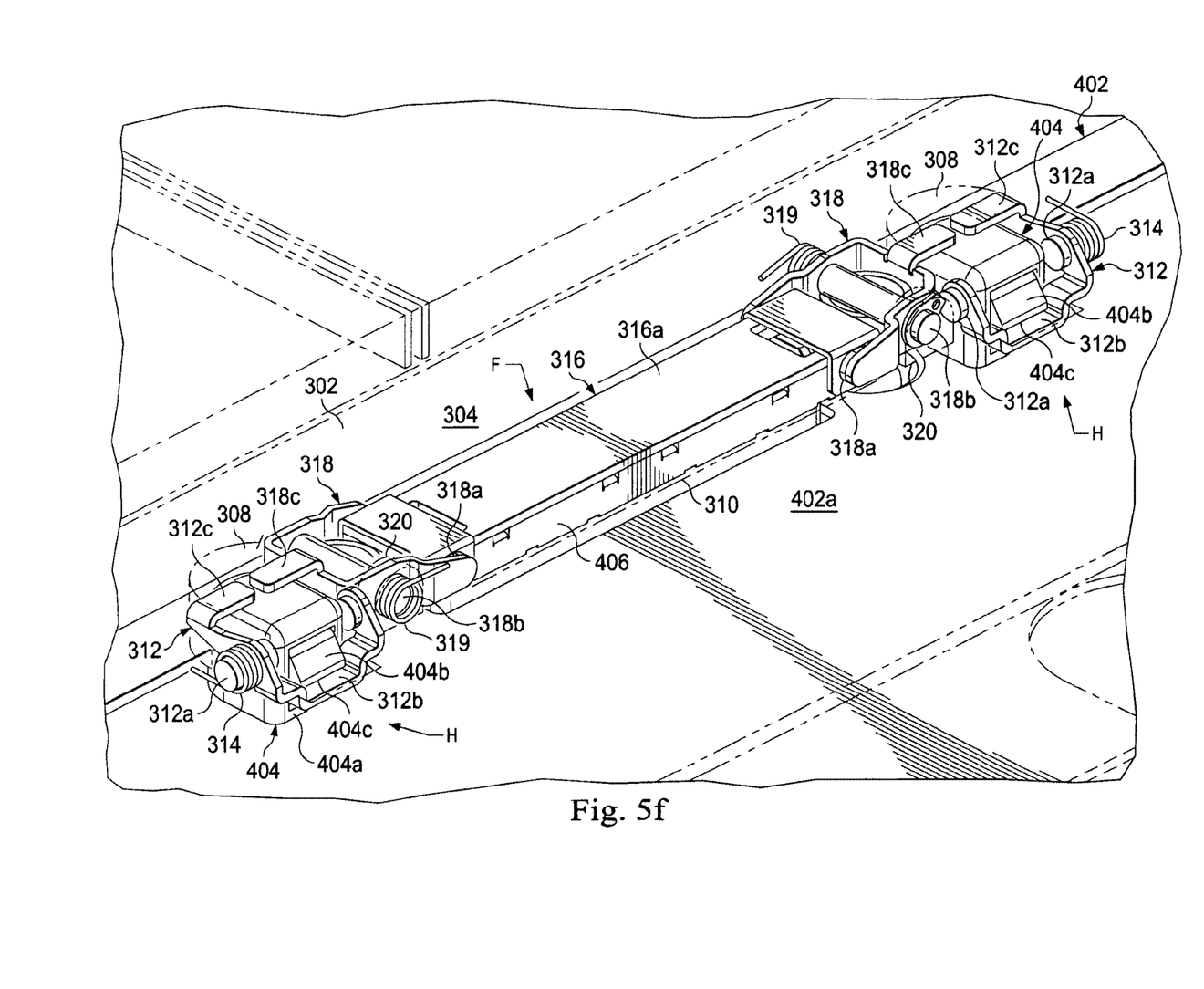
FIG. 5f is a perspective view illustrating an embodiment of an IHS docked with a docking station.
Figure 5G:
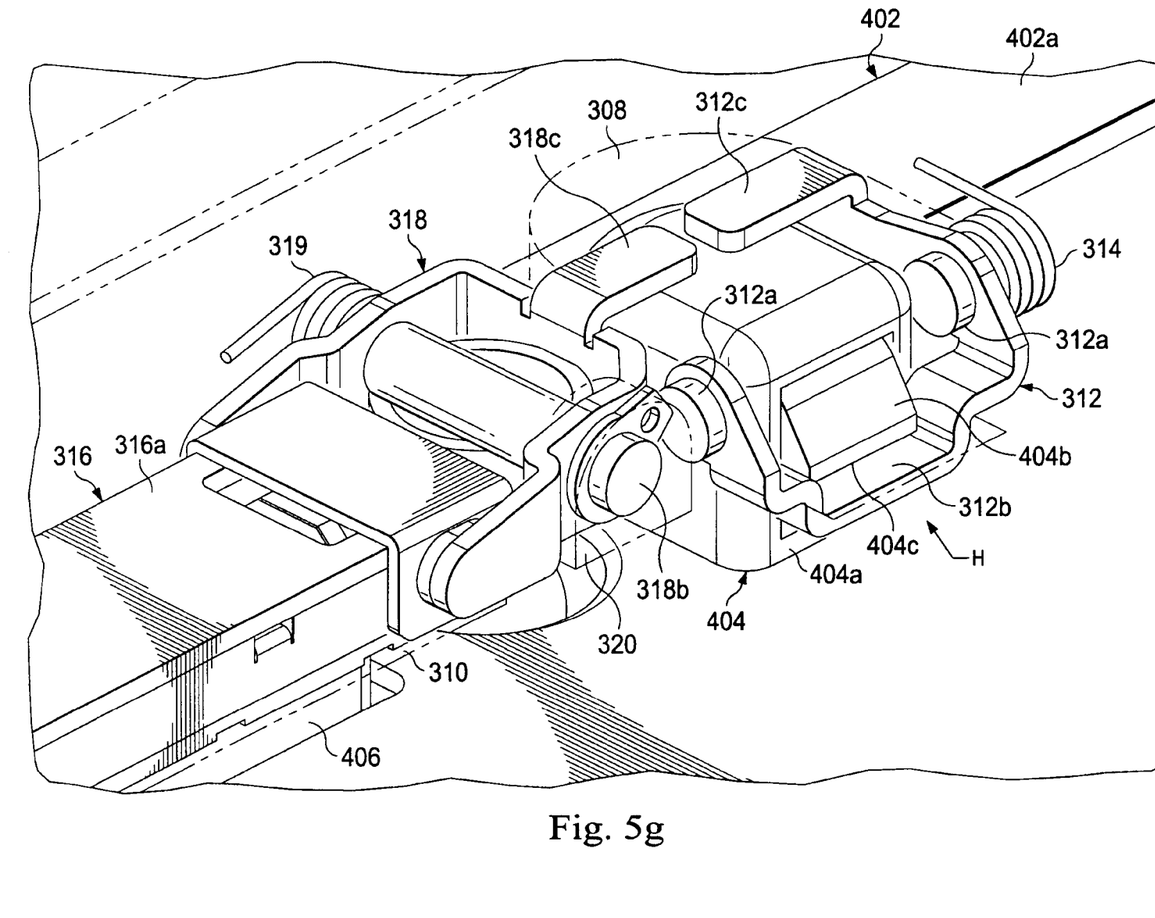
FIG. 5g is a perspective view illustrating an embodiment of the IHS docking components docked with a docking station.
Figure 5H:
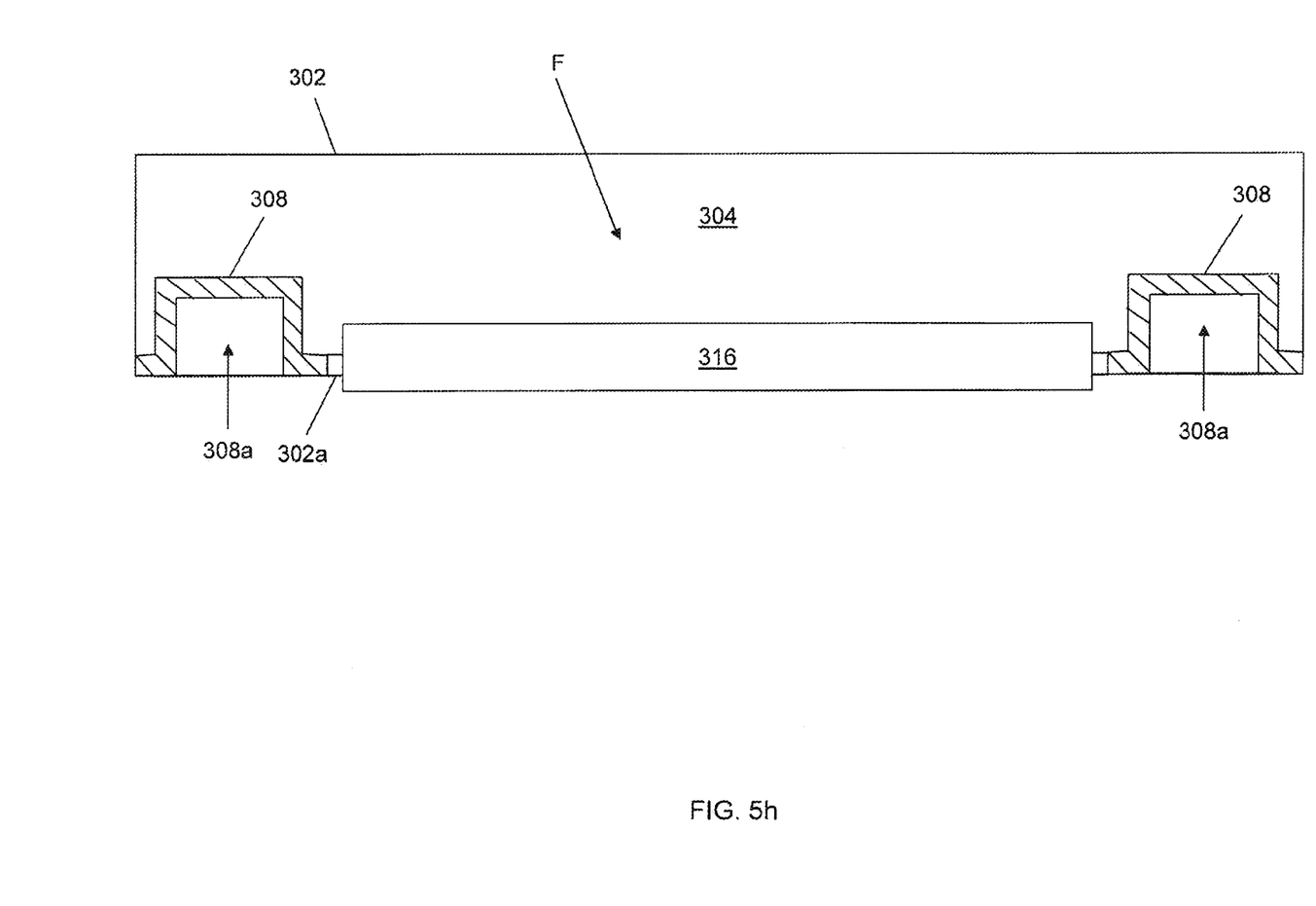
FIG. 5h is a cross sectional view illustrating an embodiment of the IHS docking components when docked with a docking station.

Referring now to FIGS. 5a, 5d, and 5e, the method 500 then proceeds to block 504 where the IHS is moved towards the docking station such that the alignment members enter the alignment member passageways. In an embodiment, the IHS chassis 302 is moved in a direction C, illustrated in FIG. 2, towards the docking station 400 such that the alignment members 404 on the docking station 400 enter the alignment member passageways 308a, as illustrated in FIGS. 5d and 5e. As the IHS chassis 302 continues to move towards the docking station 400, the method 500 proceeds to block 506 where the docking members are engaged with the alignment members. In an embodiment, continued movement of the IHS chassis 302 in the direction C causes the alignment members 404 to move through the alignment member passageways 308a until the alignment members 404 engage the docking actuators 312c on the alignment member securing devices 312 and the docking actuators 318c on the IHS connector moveable couplings 318, as illustrated in FIGS. 5d and 5e.

Referring now to FIGS. 5a, 5f, 5g, and 5h, the method 500 then proceeds to block 508 where the IHS connector is extended into mating engagement with the docking connector. Continued movement of the IHS chassis 302 in the direction C after engagement of the alignment members 404 with the docking actuators 318c causes the IHS connector moveable couplers 318 to pivot in a direction D, illustrated in FIG. 5e, about their pivotal connections 318 to the chassis base coupling members 320 on the chassis base 302 such that the pivotal connections 318a between the IHS connector moveable couplers 318 and the IHS connector 316 move in a direction E and cause the IHS connector 316 to move towards the IHS connector opening 310, as illustrated in FIG. 5e. As can be seen in the embodiment illustrated in FIGS. 5e, 5f, 5g, and 5h, when the alignment members 404 have been positioned fully in the alignment member passageways 308a and in engagement with the docking actuators 318c on the IHS connector moveable couplings 318, the IHS connector 316 is moved in the direction E through the IHS connector opening 310 such that the IHS connector 316 extends out of the IHS connector opening 310 in an extended orientation F such that the IHS connector 316 mates with the docking connector 406 on the docking station 400. In an embodiment, the IHS connector 316 may extend approximately 2.5 millimeters past the outer surface 302a of the chassis base 302 to mate with the docking connector 406 on the docking station 400. In an embodiment where the docking station 400 is a conventional docking station, the IHS connector 316 will extend to a position relative to the alignment member passageways 308a that is approximately equal to those relative positions in conventional IHSs that are designed to dock with the docking station 400.

Substantially concurrently with block 508, the method 500 proceeds to block 510 where the securing members are moved into engagement with the alignment members. Continued movement of the IHS chassis 302 in the direction C after engagement of the alignment members 404 with the docking actuators 312c causes the alignment member securing device 312 to pivot in a direction G, illustrated in FIG. 5e, about their pivotal connections 312a to the alignment passageway section 308 on the chassis base 302 such that the securing members 312b move into the alignment member passageway, as illustrated in FIG. 5e. As can be seen in the embodiment illustrated in FIGS. 5e, 5f, 5g, when the alignment members 404 have been positioned fully in the alignment member passageways 308a and in engagement with the docking actuators 312c on the alignment member securing devices 312, the alignment member securing devices 312 move to a securing orientation H such that the securing members 312b engage the stop surface 404c on the securing member actuators 404b of the IHS securing members 404a on the alignment members 404. In an embodiment, the securing members 312b may extend out past the outer surface 302a of the chassis base 302 to engage the IHS securing members 404a on the alignment members 404. In an embodiment where the docking station 400 is a conventional docking station, the securing members 312b will extend to a position relative to the alignment member passageways 308a that is approximately equal to those relative positions in conventional IHSs that are designed to dock with the docking station 400. With the securing members 312b engaging the IHS securing members 404a, the IHS chassis 300 is secured to the docking station 400 with the IHS connector 316 mated with the docking connector 406. As discussed above, in some embodiments, the IHS securing member 404a may be resiliently coupled to the alignment member 404 such that engagement of the securing member 312b and the IHS securing member 404a may cause the IHS securing member 404a to move relative to the alignment member 404 (e.g., into a cavity defined by the alignment member 404) to allow the stop surface 404c on the IHS securing member 404a to engage the securing member 312c.

Once the IHS chassis 300 is docked to the docking station 400, an IHS user may use the peripheral devices connected to the docking station 400 with the IHS, as is known in the art. In order to release the IHS chassis 300 from the docking station 400, the IHS user may, for example, actuate a release button on the docking station 400 to move the IHS securing members 404a relative to the alignment members 404 such that they no longer engage the securing members 312b in order to allow the IHS chassis 300 to be lifted off the docking station 400 to disengage the IHS connector 316 and the docking connector 406.

Thus, a docking system and method have been described that includes an IHS with a retractable IHS connector that is biased into a retracted orientation that is at least partially within the IHS when the IHS is not docked with a docking station, and that extends into an extended orientation when the IHS is docked with the docking station in order to mate with a docking connector on the docking station. Such a docking system and method allow the IHS connector to be used in thin or ultrathin IHSs to allow those thin or ultrathin IHSs to dock to docking stations (either new or conventional docking stations) without interfering with any IHS components in the thin or ultrathin IHS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A docking system, comprising:
   a dockable component chassis defining an alignment member passageway and a component connector opening;
   a component connector that is moveably coupled to the dockable component chassis adjacent the component connector opening and that is resiliently biased into a retracted orientation; and
   a docking actuator located in the alignment member passageway and coupled to the component connector, wherein the docking actuator is configured, in response to engagement with an alignment member on a docking station during a docking process, to move the component connector towards the component connector opening and into an extended orientation to engage a docking connector on the docking station.

2. The docking system of claim 1, further comprising:
   an alignment member securing device that is moveably coupled to the dockable component chassis adjacent the alignment member passageway and that is resiliently biased into a non-securing orientation.

3. The docking system of claim 2, further comprising:
   a securing actuator located in the alignment member passageway and coupled to the alignment member securing device, wherein the securing actuator is configured, in response to engagement with the alignment member on the docking station during the docking process, to cause the alignment member securing device to engage the alignment member to secure the dockable component chassis to the docking station.

4. The docking system of claim 3, wherein the docking actuator and the securing actuator are provided by a single actuator device.

5. The docking system of claim 1, wherein at least a portion of the component connector extends through the component connector opening and out of the dockable component chassis when in the extended orientation.

6. The docking system of claim 1, wherein the component connector is housed within the dockable component chassis and does not extend through the component connector opening when in the extended orientation.

7. The docking system of claim 1, wherein at least a portion of the component connector extends through the component connector opening and out of the dockable component chassis when in the retracted orientation.

8. An information handling system (IHS), comprising:
   an IHS chassis defining an alignment member passageway and an IHS connector opening;
   a processing system housed in the IHS chassis;
   a memory system coupled to the processing system and housed in the IHS chassis;
   an IHS connector that is coupled to the processing system, moveably coupled to the IHS chassis adjacent the IHS connector opening, and resiliently biased into a retracted orientation; and
   a docking actuator located in the alignment member passageway and coupled to the IHS connector, wherein the docking actuator is configured, in response to engagement with an alignment member on an IHS docking station during an IHS docking process, to move the IHS connector towards the IHS connector opening and into an extended orientation to engage an IHS docking connector on the IHS docking station.

9. The IHS of claim 8, further comprising:
   an alignment member securing device that is moveably coupled to the IHS chassis adjacent the alignment member passageway and that is resiliently biased into a non-securing orientation.

10. The IHS of claim 9, further comprising:
    a securing actuator located in the alignment member passageway and coupled to the alignment member securing device, wherein the securing actuator is configured, in response to engagement with the alignment member on the IHS docking station during the IHS docking process, to cause the alignment member securing device to engage the alignment member to secure the IHS chassis to the IHS docking station.

11. The IHS of claim 10, wherein the docking actuator and the securing actuator are provided by a single actuator device.

12. The IHS of claim 8, wherein at least a portion of the IHS connector extends through the IHS connector opening and out of the IHS chassis when in the extended orientation.

13. The IHS of claim 8, wherein the IHS connector is housed within the IHS chassis and does not extend through the IHS connector opening when in the extended orientation.

14. The IHS of claim 8, wherein at least a portion of the IHS connector extends through the IHS connector opening and out of the IHS chassis when in the retracted orientation.

* * * * *